(12) United States Patent
Beniers et al.

(10) Patent No.: US 11,388,887 B2
(45) Date of Patent: Jul. 19, 2022

(54) FEEDING DEVICE AND METHOD FOR FEEDING POULTRY SUCH AS COCKS, AND ANIMAL HOUSE PROVIDED WITH SAID FEEDING DEVICE

(71) Applicant: VDL Agrotech B.V., Eindhoven (NL)

(72) Inventors: Marinus Lambertus Maria Beniers, Eindhoven (NL); Joost Johannes Christianus Van Den Broek, Eindhoven (NL)

(73) Assignee: VDL AGROTECH B.V., Eindhoven (NL)

( * ) Notice: Subject to any disclaimer, the term of this patent is extended or adjusted under 35 U.S.C. 154(b) by 386 days.

(21) Appl. No.: 16/641,949

(22) PCT Filed: Aug. 30, 2018

(86) PCT No.: PCT/NL2018/050559
§ 371 (c)(1),
(2) Date: Feb. 25, 2020

(87) PCT Pub. No.: WO2019/050393
PCT Pub. Date: Mar. 14, 2019

(65) Prior Publication Data
US 2020/0245596 A1 Aug. 6, 2020

(30) Foreign Application Priority Data
Sep. 6, 2017 (NL) ...................................... 2019494

(51) Int. Cl.
*A01K 39/01* (2006.01)
*A01K 39/012* (2006.01)
*A01K 39/014* (2006.01)

(52) U.S. Cl.
CPC .......... *A01K 39/012* (2013.01); *A01K 39/014* (2013.01)

(58) Field of Classification Search
CPC .... A01K 39/012; A01K 39/014; A01K 39/01; A01K 39/0125; A01K 39/04
See application file for complete search history.

(56) References Cited

U.S. PATENT DOCUMENTS

| 3,485,215 A | * | 12/1969 | Scott | ................... | A01K 39/0125 |
| | | | | | 119/51.11 |
| 3,585,970 A | * | 6/1971 | Scott | ................... | A01K 39/0125 |
| | | | | | 119/53 |

(Continued)

FOREIGN PATENT DOCUMENTS

| GB | 1 022 509 A | 3/1966 |
| WO | 2013028067 A1 | 2/2013 |
| WO | WO-2018161136 A1 * | 9/2018 ........... A01K 39/014 |

OTHER PUBLICATIONS

International Search Report corresponding to International application Nos. PCT/NL2018/050559, dated Feb. 1, 2019 (2 pages).

*Primary Examiner* — Trinh T Nguyen
(74) *Attorney, Agent, or Firm* — Maginot, Moore & Beck, LLP

(57) ABSTRACT

The invention relates to a feeding device for poultry such as cocks, comprising an elongated feed transporting element with at least a bottom wall, a feed trough provided underneath it and parallel to it with a bottom, upright side walls and an at least partially open upper side, a feed transporting device for transporting feed through the feed transporting element, and a displacing device for moving the feed transporting element and the feed trough in a vertical direction relative to one another between a filling position and a feeding position, wherein the feed transporting element is provided on its underside with a plurality of passages for feed and a plurality of individual metering units provided at a distance from one another on the underside of the feed transporting element, each of which connects to one passage (Continued)

of the plurality of passages and each of which is configured for metering an individual, predetermined portion of feed received from the feed transporting element into the feed trough. The invention also relates to a method for feeding poultry such as cocks, and an animal house provided with such a feeding device.

19 Claims, 6 Drawing Sheets

(56) References Cited

U.S. PATENT DOCUMENTS

| | | | | |
|---|---|---|---|---|
| 3,598,087 | A * | 8/1971 | Ramser | A01K 39/0125 |
| | | | | 119/56.2 |
| 3,971,340 | A * | 7/1976 | Allen | A01K 39/0125 |
| | | | | 119/57.4 |
| 4,153,010 | A | 5/1979 | Erfeling | |
| 4,530,308 | A * | 7/1985 | Sheets | A01K 39/01 |
| | | | | 119/57.6 |
| 4,722,301 | A * | 2/1988 | Strong | A01K 39/0125 |
| | | | | 119/51.11 |
| 4,815,417 | A * | 3/1989 | Strong | A01K 39/0125 |
| | | | | 119/57.4 |
| 2013/0139755 | A1 * | 6/2013 | Steudler, Jr. | A01K 39/0125 |
| | | | | 119/51.01 |

\* cited by examiner

FEEDING DEVICE AND METHOD FOR FEEDING POULTRY SUCH AS COCKS, AND ANIMAL HOUSE PROVIDED WITH SAID FEEDING DEVICE

This application is a 35 U.S.C. 371 National Stage application of PCT/NL2018/050559, filed Aug. 30, 2018, and claims priority to Netherland Application No. 2019494 filed on Sep. 6, 2017. The entire contents of the above-mentioned patent applications are incorporated herein by reference as part of the disclosure of this U.S. application.

According to a first aspect, the present invention relates to a feeding device for poultry such as cocks, comprising an elongate feed transporting element with at least a bottom wall, a feed trough provided underneath it and parallel to it, which has a bottom, upright side walls and an at least partially open upper side.

According to a second aspect, the present invention relates to an animal house provided with a feeding device according to the first aspect of the present invention.

According to a third aspect, the present invention relates to a method for feeding poultry such as cocks.

A feeding device for feeding poultry is known from NL2007284. Although this feeding device works well in practice, it could be improved with respect to the adjustability of the amount of feed offered and the uniformity of the amount of feed offered over the length of the feed trough.

An object of the present invention is consequently to supply a feeding device for poultry such as cocks, wherein the adjustability of the amount of feed offered and/or the uniformity of the amount of feed offered over the length of the feed trough are improved.

This object is achieved with the feeding device according to the present invention, comprising

- an elongate feed transporting element with at least a bottom wall,
- a feed trough provided underneath it and parallel to it, which has a bottom, upright side walls and an at least partially open upper side,
- a feed transporting device for transporting feed through the feed transporting element, and
- a displacing device for moving the feed transporting element and the feed trough in a vertical direction relative to one another between a filling position and a feeding position, wherein the feed transporting element is provided on its underside with a plurality of passages for feed and a plurality of individual metering units provided at a distance from one another on the underside of the feed transporting element, each of which connects to a passage of the plurality of passages and each of which is configured for metering an individual, predetermined portion of feed received from the feed transporting element into the feed trough, wherein each metering unit comprises a metering space delimited at least partly by a perimeter wall, wherein the metering space determines a volume for the portion of feed to be metered with said metering unit, in which, at least in the filling position, each metering unit is in contact with the bottom of the feed trough so that the peripheral wall of the metering unit together with the bottom of the feed trough and the bottom wall of the feed transporting element closes the metering space of the metering means for feed so as to be able to fill the metering space in the filling position with the portion of feed from the feed transporting element, via the respective passage, and wherein, in the feeding position, the feed transporting element is located at a greater distance from the feed trough than in the filling position, so that the plurality of metering units are clear of the bottom of the feed trough so that the portions of feed metered on the bottom of the feed trough are accessible for the poultry.

The present invention is based at least partly on the realization that in the known feeding device the uniformity varies over the length of the feeding device as a consequence of feed present in the feed transporting element. The feed present in the feed transporting element exerts a pressure, during transport, via the passages on the underside of the feed transporting element, on feed already present in the feed trough so that said feed present in the feed trough is spread over the width of the feed trough over a greater or smaller distance, depending on the type of feed, at right angles to the longitudinal direction of the feed trough. This also results in a decrease in the amount of feed per unit length for an increasing distance from a feed supply side of the feed trough. Because the feeding device according to the present invention is provided with metering units, each of which is connected to a passage of the feed transporting element, improved uniform metering of the feed over the length of the feeding device can be achieved. The metering units determine the volume of the portion of feed to be metered at the site of the metering unit. As a result, the consistency of the feed present in the feed transporting element no longer has an influence, or at least the influence is greatly reduced, on the uniformity of the distribution of feed over the length of the feed trough. The provision of an individual metering unit per passage with a volume of the portion of feed determined by the metering unit makes it possible, in a very effective manner, to offer such a portion of feed per animal, i.e. with a volume determined by one of the metering units.

In this case it is advantageous if the feeding device comprises adjusting means for setting the mutual distance between the feed transporting element and the bottom of the feed trough in the filling position, wherein the adjusting means comprise a number of spacers, each with a supporting surface for supporting the feed transporting element, wherein the distance between the supporting surface and the bottom of the feed trough is adjustable for setting, at the location of each spacer, the mutual distance between the feed transporting element and the bottom of the feed trough, wherein, or whereby the volume of the metering space of each of the metering units can be altered in relation to the mutual distance between the feed transporting element and the bottom of the feed trough. Because the volume of the metering space can be altered in relation to the mutual distance between the feed transporting element and the bottom of the feed trough, setting of the portions of feed can be done in a relatively advantageous manner.

It is advantageous if, in the filling position, the feed transporting element is at a predetermined distance from the bottom of the feed trough, adjustable in a range between a minimum and a maximum value, wherein a height of the peripheral wall of each of the metering units, in the vertical direction, can be altered so that, in the range between the minimum and the maximum value, the metering unit is in contact with the bottom of the feed trough. This is favourable for being able to alter, in a relatively practical manner, the volume of the metering space without the need to replace the metering units of the feeding device for setting another desired portion. This improves the adjustability of the amount of feed offered over the length of the feed trough.

In a practical embodiment of the feeding device, the perimeter wall of each of the metering units is provided with a first wall part and a second wall part, wherein the first wall part and the second wall part are arranged to surround the metering space at least partly, wherein the first wall part and the second wall part are movable relative to one other for altering the volume of the metering space of the metering unit. In this embodiment, the metering volume of a metering unit can be adjusted in an especially practical manner without the need to replace the metering units of the feeding device for setting another desired metering volume for metering different portions.

In this case it is advantageous if the first wall part of each of the metering units is arranged to surround the second wall part of the metering unit at least partly on the outside thereof, wherein the first wall part can be slid along an outer side of the second wall part for altering the volume of the metering space of the metering unit. This is a relatively reliable and robust configuration for being able to alter the volume of the metering space.

In this case it is advantageous if the first wall part is shell-shaped and is connected at an upper side to the feed transporting element and at an underside has a wall part extending outwards, preferably collar-shaped, and wherein the second wall part is shell-shaped and at an upper side has a wall part extending inwards that surrounds the shell shape of the first wall part and with which the second wall part can be suspended on the first wall part. This is a relatively reliable and robust configuration for being able to alter the volume of the metering space.

In an embodiment of the feeding device it is favourable if during operation of the metering device the volume of the metering space of each of the metering units changes automatically as a consequence of mutual movement of the feed trough and feed transporting element in the vertical direction. This is favourable for being able to alter the volume of the metering space in a relatively practical manner without the need to replace the metering units of the feeding device for setting another desired portion. This improves the adjustability of the amount of feed offered over the length of the feed trough.

It is advantageous if the metering units are provided at a distance apart in the range 5-50 cm, preferably 10-25 cm. The aforementioned distance apart is favourable for achieving a desired degree of uniformity of the amount of feed offered over the length of the feed trough. In operation, a portion, such as of a predetermined volume, is then metered per animal at a certain aforesaid distance apart in the feed trough. Each individual animal then has a required feeding place along the feed trough so as to be able to eat the portion of feed offered for that animal, with an individual one of the number of metering units.

In an embodiment of the feeding device is it favourable if, in the filling position, the volume of the metering space of each of the metering units is in the range 0.01-0.05 $m^3$. With this volume range, a portion with a volume in said range can be offered reliably per animal with the device according to the invention.

Preferably, the feed trough, viewed over its length, is provided with suspension elements located at a distance from each other for suspending the feed trough in an animal house. In this way the floor area of the animal house can remain free.

In this case it is advantageous if in each case a spacer is connected to a suspension element.

In an embodiment it is advantageous if the suspension elements are plate-shaped, wherein the plate surface is positioned transversely to the longitudinal direction of the feed trough, wherein a slot is made in the plate surface positioned transversely on the bottom of the feed trough, which is adapted to the geometry of the feed transporting element, wherein the feed transporting element is extended through slots of suspension elements and wherein the feed transporting element in the filling position comes up against ends of the slots located near the bottom of the feed trough or against the spacers. Application of the slot in the plate-shaped suspension elements provides effective guidance for the feed transporting element. The aforesaid ends of the slots may then function as an end stop. It is favourable if the feed transporting element is provided directly above the feed trough and the feed trough and the feed transporting element are mutually movable in the vertical direction in operation.

The setting of the distance can be altered efficiently and simply if the spacers are each connected by means of a stepwise adjustable connection to the associated suspension element, or at least to the feed trough.

In this case it is advantageous if the slots have an open end on an upper side of the suspension elements, said open end being funnel-shaped for guiding the feed transporting element into the slot during movement from the feeding position to the filling position. An open upper side is favourable for bringing the feed transporting element at a relatively large distance from the feed trough.

Preferably the spacers also each have a slot that has an open end on an upper side, said slot overlapping with the slot of the suspension element to which the spacer is connected. The resultant essentially U-shaped spacers then preferably have, in both legs of the U shape, a stepwise adjustable connection with which the spacer is connected to the associated suspension element, or at least to the feed trough. The stepwise adjustable connection preferably comprises a projection such as a lip on one of the suspension element and the spacer and a plurality of recesses such as grooves in the other one of the suspension element and the spacer.

The aforesaid U-shaped spacers with the stepwise adjustable connection are advantageously applicable in a feeding device that is free from the metering units according to the feeding device according to the first aspect of the present invention. A feeding device of this kind for poultry such as cocks comprises an elongated feed transporting element with at least a bottom wall, wherein the feed transporting element is provided on its underside with a plurality of passages for feed;

a feed trough provided underneath it and parallel to it, which has a bottom, upright side walls and an at least partly open upper side, a feed transporting device for transporting feed through the feed transporting element, and a displacing device for moving the feed transporting element and the feed trough in a vertical direction relative to one another between a filling position and a feeding position, adjusting means for setting the mutual distance between the feed transporting element and the bottom of the feed trough in the filling position, wherein the adjusting means comprise a number of spacers each with a supporting surface for supporting the feed transporting element, wherein the distance between the supporting surface and the bottom of the feed trough is adjustable for setting, at the location of each spacer, the mutual distance between the feed transporting element and the bottom of the feed trough, wherein the feed trough, viewed over its length, is provided with suspension elements located at a distance from each other for suspending the feed trough in an animal house, wherein in each case a spacer is connected to a suspension element and wherein the suspension elements are plate-shaped, wherein the plate surface is located transversely to the longitudinal direction of the feed trough, wherein a slot is made in the plate surface transversely to the bottom of the feed trough, which is adapted to the geometry of the feed transporting element, wherein the feed transporting element extends through slots of suspension elements and wherein, in the filling position, the feed transporting element comes up against ends of the slots located near the bottom of the feed trough or against the spacers, wherein the slots have an open end on an upper side of the suspension elements, said open end being funnel-shaped for guiding the feed transporting element into the slot during movement from the feeding position to the filling position. Advantageous embodiments of the feeding device free from the metering units according to the first aspect of the present invention may comprise elements of the feeding device according to the first aspect of the present invention. The advantages of such embodiments are analogous to the advantages of the feeding device according to the first aspect of the present invention.

Each of the spacers preferably comprises two guide bolts secured with a spiral spring, one on each leg of the spacer, with which the spacer is pressed against the associated suspension element in operation. The aforesaid distance to be adjusted with the spacer can in that case be altered simply and efficiently by gripping the spacer and moving it away from the suspension element. In so doing, the stepwise adjustable connection is released and the spacer can be moved parallel to the suspension element. On releasing the spacer again, the spacer is again pressed against the suspension element by the spring force of the spiral springs of the guide bolts.

In an embodiment of the feeding device it is favourable if the displacing device is arranged for raising the feed trough in the vertical direction on the suspension elements of the feed trough towards the feed transporting element, for moving the feed trough from the feeding position to the filling position. In operation, this upward movement of the feed trough is a simple way of moving the feed trough out of the reach of the poultry and this eliminates any risk of trapping between the feed trough and the feed transporting element. It is then favourable if the device is arranged for raising the feed trough on the suspension elements of the feed trough towards the feed transporting element, for moving the feed trough from the feeding position to the filling position. Because only the feed trough needs to be moved and not the feed transporting element as well, the displacing device may be of simple and lightweight construction, which is favourable regarding the cost price. In addition, it is then possible, using the displacing device with upward movement of the feed trough, to move the transporting element from the filling position further upwards to a higher position, which can be called a cleaning position. In this cleaning position, the whole feeding device can be located at such a height above the floor, for example more than one metre, such as for example about 2.5 to 3 metres, so that the floor area is easily accessible, for example for cleaning. Moreover, it is also possible for the feeding device to be located in the filling position at a height of for example about 2 metres above the floor.

In a practical embodiment of the feeding device, the displacing device comprises a pulley and/or a winch construction, preferably a pipe winch or a cable winch, for moving the feed transporting element and the feed trough in the vertical direction relative to one other. Such a construction is favourable for relatively reliable adjustment of the mutual distance between the feed trough and feed transporting element.

According to a second aspect, the present invention relates to an animal house provided with at least one feeding device according to the first aspect of the present invention. The advantages of the animal house are analogous to the advantages of the feeding device according to the first aspect of the present invention.

In an embodiment of the animal house the feed trough extends from the at least one feeding device along a wall of the animal house, wherein the poultry can approach the feed trough at least in the feeding position from one long side of the feed trough, wherein at least one further feeding device for poultry is installed at a distance from the at least one feeding device, wherein the at least one feeding device and the at least one further feeding device are separated from one another by a habitable space for poultry, wherein preferably the at least one feeding device is arranged for feeding cocks and wherein the at least one further feeding device is arranged for feeding hens, in particular for broiler breeder chickens.

According to a third aspect, the present invention relates to a method for using a feeding device according to the first aspect of the present invention, said method comprising the successive steps of:

a) in the filling position, transporting feed with the feed transporting device through the feed transporting element in such a way that feed is filled via the passages from the feed transporting element into the respective metering spaces of the metering units, b) after stopping the transporting, bringing the feeding device into the feeding position by moving the feed trough and the feed transporting element away from each other so that the metering units are no longer in contact with the bottom of the feed trough and so that the poultry is able to reach the feed from the metering spaces on the bottom of the feed trough, c) allowing feed to be eaten by poultry, d) moving the feeding device to the filling position by moving the feed trough and the feed transporting element towards each other, and e) repeating steps a) to d) inclusive.

The advantages of the method are analogous to the advantages of the feeding device according to the first aspect of the present invention.

In this case it is advantageous if, between two successive steps d), the adjusting means are used for altering the setting of the mutual distance in the filling position between the feed transporting element and the bottom of the feed trough, for altering the volume of the metering spaces of the metering units. This is favourable for providing adjustability of the amount of feed offered.

In one embodiment of the method it is advantageous if the method further comprises the step of determining, prior to step a), a required amount of feed to be able to fill each of the metering spaces with feed, wherein this required amount of feed is transported by the feed transporting element during step a) so that step b) does not take place before at least almost the complete amount of feed has been filled in the metering spaces. This is favourable for achieving a desired degree of uniformity of the amount of feed offered over the length of the feed trough.

The present invention will be explained below on the basis of the description of a preferred embodiment of a feeding device according to the invention on the basis of the following schematic figures, in which.

Figure 1:
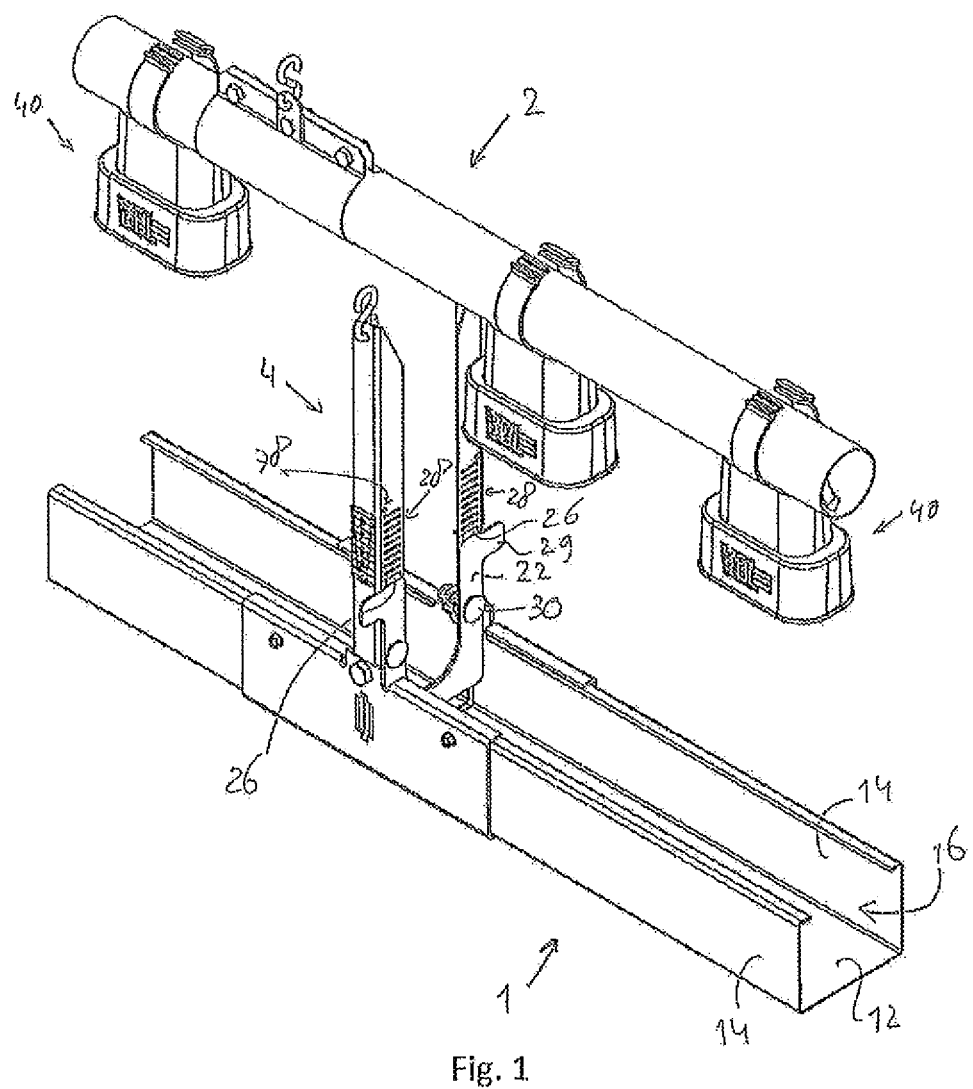
FIG. 1 shows, in isometric view, a part of a preferred embodiment of a feeding device according to the invention, in a feeding position.
Figures 2, 3B:
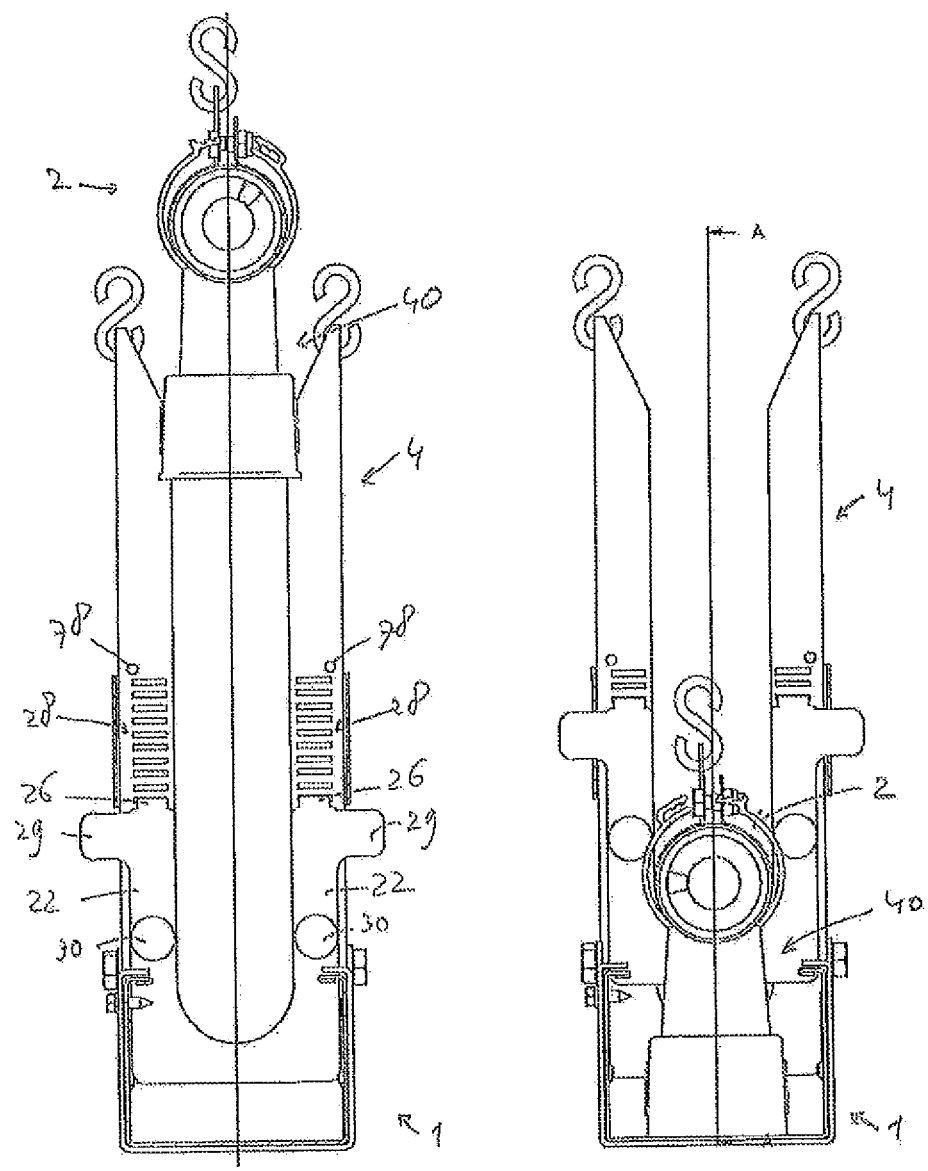
FIG. 2 shows a side view of the part shown in FIG. 1.
FIGS. 3a and 3b show a cross-section of the part shown in FIG. 1 in a filling position.
Figure 3A:
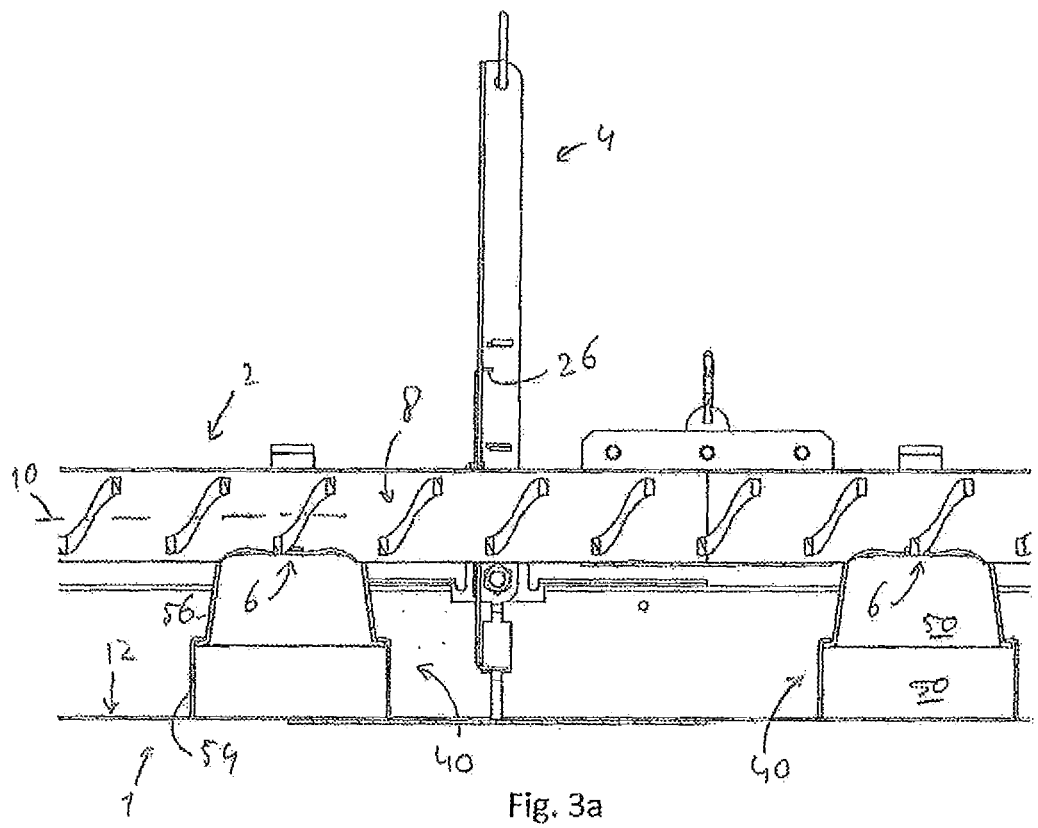

The feeding system shown in FIGS. 1-4, or at least a part thereof, has an elongate feed trough 1 and a feed transporting tube 2, forming an elongated feed transporting element, which is provided parallel to and directly above the feed trough 1. Feed trough 1 as well as feed transporting tube 2 usually extend over tens of metres in an animal house for poultry, which is not shown in detail. Feed trough 1 is, as can be seen in particular in FIG. 1, essentially U-shaped with a flat bottom 12 and, on the long side, upright side walls 14, which are bent over at the free ends. The bottom 12 and side walls 14 determine an interior space 16 of the feed trough 1.

Feed transporting tube 2 has a completely closed peripheral wall, although this is not necessary for the invention. The feed transporting element may optionally be open at the upper side, but this is not preferred. Feed transporting tube 2 is preferably suspended at two to six metres in the animal house and feed trough 1 is also suspended in the animal house by means of suspension elements, offset by two to six metres, but preferably 10 to 20 cm relative to the feed transporting tube 2. FIG. 1 shows one suspension element 4 that is fastened to the feed trough 1 and on which the feed trough 1 is suspended. The feeding device comprises a displacing device for moving the feed trough 1 and feed transporting tube 2 relative to one another. This displacing device relates to a winch construction present in the suspension of the feed trough 1 and present in the suspension of the feed transporting tube 2, with which the height of the feed transporting tube 2 (in the animal house) can be kept constant and with which the height of the feed trough 1 can be varied.

Figure 9:
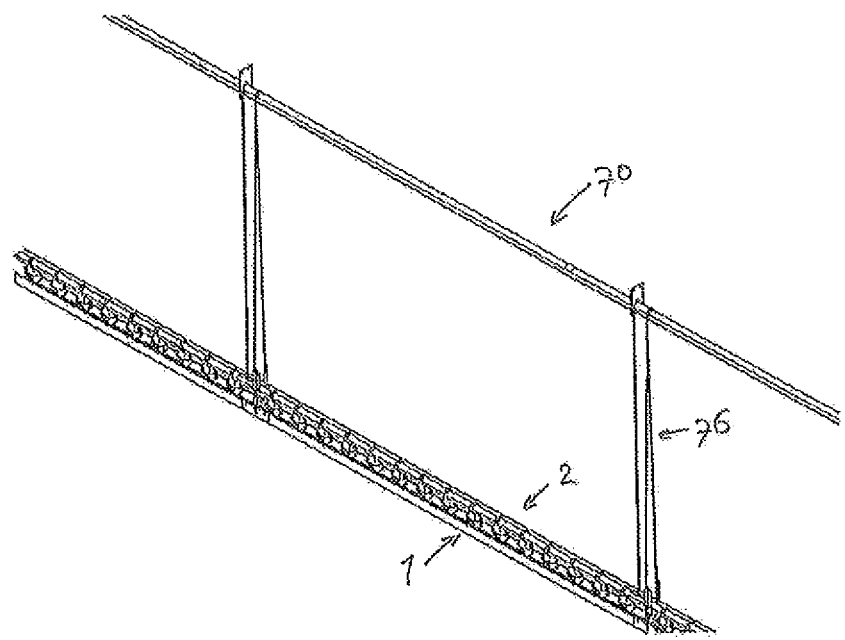
FIG. 9 shows, in isometric view, a part of a preferred embodiment of a feeding device according to the invention.

The embodiment of a feeding device shown in FIG. 9 is provided with a pipe winch 70. By rotating an elongated pipe of the pipe winch about the longitudinal axis of the pipe winch 70, the feed trough 1 is moved in the vertical direction relative to the feed transporting tube 2 by winding and unwinding a cable connected to the suspension elements on the pipe of the pipe winch 70.

Figure 10:
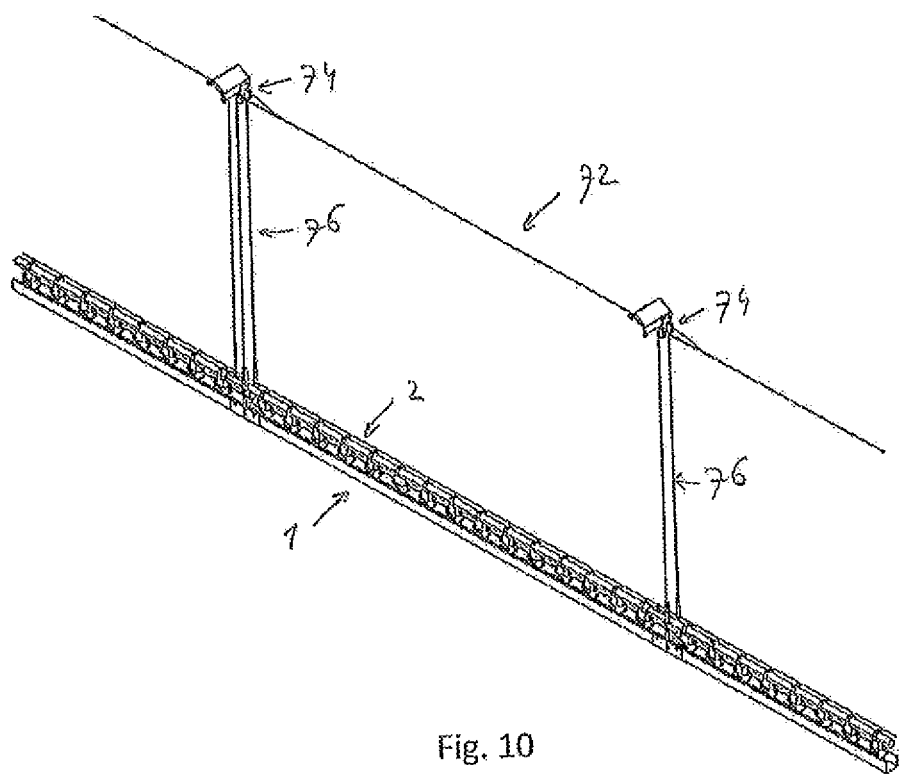
FIG. 10 shows, in isometric view, a part of a preferred embodiment of a feeding device according to the invention.

A further embodiment of a feeding device according to the present invention is shown in FIG. 10, wherein the feeding device is provided with a cable winch 72. The cable winch is provided with pulleys 74 for guiding a winch cable 76. The winch cable 76 is connected at one end thereof to the feed transporting tube 2. By winching the winch cable 76 over the pulleys 74, the feed trough 1 can be moved in the vertical direction relative to the feed transporting tube 2.

Suspension elements 4 are fastened to the feed trough 1. The distance between the suspension elements 4 at right angles to the longitudinal direction of the feed trough 1 is adapted to the diameter of the feed transporting tube 2. Feed transporting tube 2 can move between the suspension elements 4 from a feeding position shown in FIG. 1, and a filling position shown in FIGS. 3a, 3b and 4. A spacer 22 is also fitted on each of the suspension elements 4, and these spacers 22 function as adjusting means for setting the distance between tube 2 and bottom 12 of the trough 1. Spacer 22 is also plate-shaped and lies against the plate surface of the suspension element 4. The spacer 22 is made U-shaped. The lower part of the U-shaped spacer 22 forms a stop for the feed transporting tube 2. The distance between tube 2 and bottom 12 in the filling position can be adjusted by fastening the spacer 22 at different heights. A lip 26, facing the plate surface of the suspension element, is fitted to the top of each of the legs of the U-shaped spacer 22, which in operation drops into one of the series of grooves 28 provided thereon in the suspension element for the stepwise adjustable connection of the spacer 22 to the suspension elements 4. The spacer 22 is pressed against the associated suspension element 4 by means of two guide bolts secured with a spiral spring 30, each extending through a hole provided for the respective guide bolt in the leg of the spacer. Said distance that is to be set with the spacer 22 can be altered by gripping the spacer 22 on the projecting lips 29 thereof, one on each leg, and moving it away from the suspension element 4. As a result, the lips 26 are separated from the groove and can then be brought into another of the grooves 28. During movement of the spacer 22 parallel to the suspension element, the guide bolts 30 slide into slots in the suspension element 4 that are not visible in the figures, through which the guide bolts extend. The lips 29 may then be released so that the spacer 22 is again pressed by the spring force of the spiral springs of the guide bolts 30 against the suspension element 4. Thereby the position of the spacer 22 relative to the suspension element 4 is fixed (again) and therefore the smallest possible distance between the tube 2 and feed trough 1 in the filling position, determined by the lowest end of the slot in the spacer, is also fixed. Thus, by means of these adjusting means, the mutual distance between tube 2 and bottom 12 of feed trough 1 in the filling position can be set variably, more specifically indexing. In an alternative embodiment it is conceivable for the setting to be continuously variable. The suspension elements 4 are further provided with wire passages 78 to make it possible to feed a wire, not shown in more detail, through the suspension elements in the longitudinal direction of the feeding device 1, in order to prevent, or at least greatly reduce the possibility of, poultry standing on the feed trough 1.

Feed transporting tube 2 relates to a hollow tube in which a number of openings 6 for feed, located at a distance from each other and distributed over the length, are made in the underside of the wall of tube 2. The openings 6 are located at a mutual distance of about 20 centimetres, although this distance may also be selected to be smaller or larger, preferably in the range from 10 to 25 cm. See also FIG. 3a and FIG. 4. In the feed transporting tube 2, a screw conveyor 8 that is known per se is provided, which extends over the length of the feed transporting tube and can be rotated by driving means that are not shown in detail about the central axis 10 of the feed transporting tube 2. By means of feed supplying means at the site of an upstream head end (not shown in greater detail in the figures) such as comprising bringing a feed into the feed transporting tube 2 and driving the screw conveyor 8, feed may be transported through the feed transporting tube 2.

Metering units 40 are provided on the feed transporting tube. The metering units 40 are fitted detachably on the tube 2, each at the site of a passage in the feed transporting tube. The metering units each have a metering space 50 delimited at least partly by a peripheral wall. The metering space 50 determines a volume for the portion of feed to be metered with said metering unit 40. The feed is usually a dry feed such as for example ground feed such as meal, or feed pelletized in a press, i.e. pellets, or crumbs such as crumbled pellets. In the filling position, each metering unit 40 is in contact with the bottom 12 of the feed trough so that the peripheral wall 54, 56 of the metering unit together with the bottom of the feed trough 1 and the bottom wall of the feed transporting element 2 enclose the metering space of the metering unit for feed. In this way, the metering space 50 in the filling position can be filled with the portion of feed from the feed transporting element, via the respective passage, without poultry being able to reach the feed or without the feed flowing out of the metering space. In the feeding position, in contrast, the feed transporting element is located at a greater distance from the feed trough than in the filling position, so that the plurality of metering units are clear of the bottom of the feed trough 1, as shown in FIG. 1, so that the metered portions of feed on the bottom of the feed trough 1 are accessible for the poultry.

During filling of the metering spaces 50 in the filling position, the feed flows at the position of the openings 6 from the feed transporting tube 2 and drops into a metering space 50. In the filling position shown in FIG. 4, the metering space 50 is delimited by an adjustable tubular sleeve 52 forming a peripheral wall, and the bottom 12 of the feed trough 1. The volume of the metering space 50 in the filling position shown in FIG. 4 can be altered by setting the distance from the tube 2 to the trough 1 with the adjusting means, so that the volume of the metering space determines a volume for the portion of feed to be metered at the site of the adjustable sleeve 52.

It should be noted that the feed trough 1 itself can also be filled when the sleeve 52 is clear of the bottom 12 of the feed trough 1. In this case the feed flows from the opening 6 freely onto the bottom 12 of the feed trough 1. However, fixed portions are not dispensed in this state wherein the sleeve 52 is clear of the bottom.

The adjustable sleeve 52, shown in more detail in FIG. 5-8, is provided with a first peripheral wall part 56 and a second peripheral wall part 54. The second peripheral wall part 54 is provided with a VDL logo and arranged to lie on the bottom 12 of the trough 1 in the filling position on an underside of the second peripheral wall part 54. The second peripheral wall part 54 is slidable and telescopic, relative to the first peripheral wall part 56, for providing a smaller or larger metering space 50. The first peripheral wall part 56 is shell-shaped and is connected on an upper side to the feed transporting element 2 and on an underside has a preferably collar-shaped wall part 55 extending outwards. The second peripheral wall part 54 is also shell-shaped and on an upper side has a wall part 57 extending inwards that surrounds the shell shape of the first peripheral wall part and with which the second peripheral wall part can be suspended on the first peripheral wall part. In operation, the volume of the metering space of each of the metering units changes automatically in operation of the metering device as a consequence of mutual movement of the feed trough and feed transporting element in the vertical direction.

Figure 4:
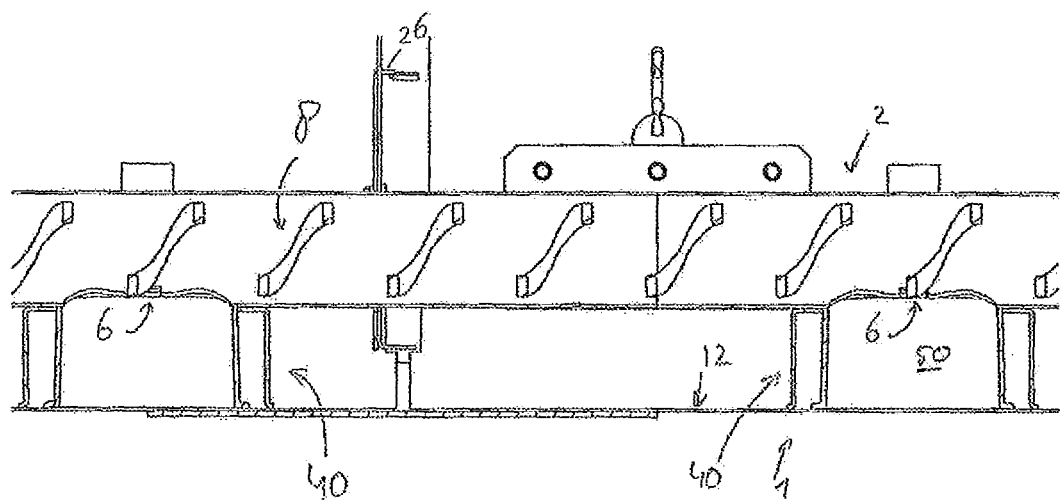
FIG. 4 shows a cross-section of the part shown in FIG. 1 in a filling position.
Figure 5:
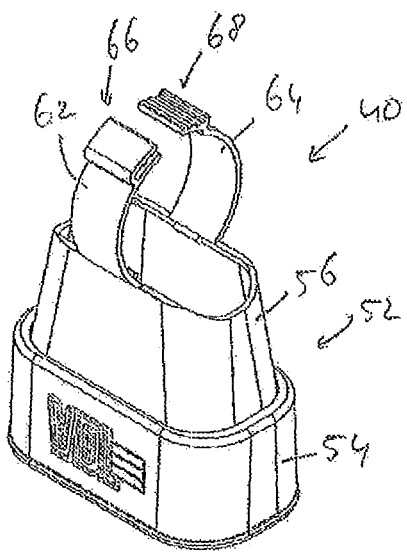
FIG. 5 shows, in isometric view, a part of a metering unit of the part shown in FIG. 1 in a first state.
Figure 6:
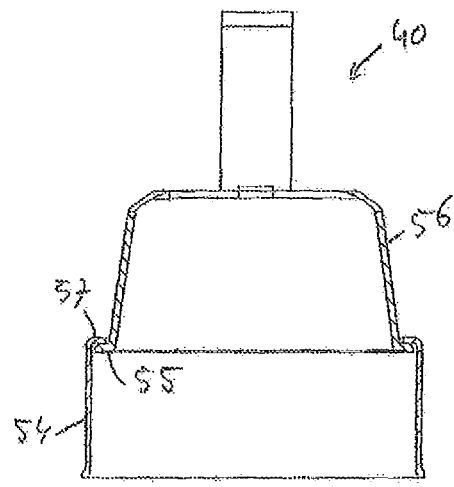
FIG. 6 shows in cross-section the metering unit of FIG. 5 in the first state.
Figure 7:
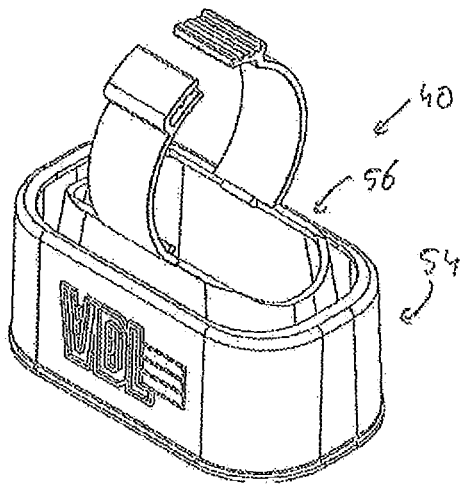
FIG. 7 shows, in isometric view, a part of a metering unit of the part shown in FIG. 1 in a second state.
Figure 8:
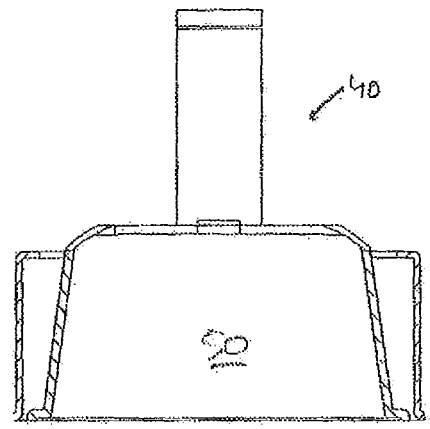
FIG. 8 shows in cross-section the metering unit of FIG. 7 in the second state.

In the state of the adjustable sleeve 52 shown in FIGS. 4, 7 and 8, the volume of the metering space 50 is at a minimum, wherein the second peripheral wall part 54 does not limit the metering space 50. In the state of the adjustable sleeve 52 shown in FIGS. 3a, 5 and 6, the volume of the metering space 50 is at a maximum, wherein an upper edge 57 of the second peripheral wall part 54 rests against the collar 55 of the first peripheral wall part 56. The adjustable sleeve 52 can be secured detachably to the tube 2 with two curved parts 62, 64 fastened to the second peripheral wall part 56. The curved parts 62, 64 are provided, at an end located opposite the second peripheral wall part 56, with fasteners 66, 68 for fastening the two curved parts 62, 64 together by means of a snap connection, thus enclosing and therefore securing the tube 2 with the curved parts 62, 64 and the fasteners 66, 68.

The feed supplying means are arranged to meter a predetermined amount of feed, which essentially coincides with the combined volume of the metering spaces that are coupled to the tube 2.

In operation, the feeding device operates as follows. The starting state is the feeding position according to FIG. 1. If desired, the setting of the spacers 22 can be changed for altering the volume of the metering space. For young animals the portion of feed can for example be increased gradually over time, based on the growth of the animals. For adult animals the portion of feed can be adjusted if the animals are found to have an undesirable increase or decrease in weight. Then the feed trough 1 is raised towards the feed transporting tube 2. The tube 2 then slides between the suspension elements 4 and comes up against the lowest end of the slot in the spacer 22. The distance between the underside of the tube 2 and the bottom 12 of the feed trough 1 and therefore the volume of the metering spaces 50 is thus determined, depending on the setting of the spacers in a minimum state according to FIG. 4 or a maximum state according to FIG. 3a or an intermediate state. Then the feed supplying means bring feed into the feed transporting tube 2 and the screw conveyor 8 is switched on. After some time all the metering spaces of the adjustable sleeves 52 are filled with feed, and the feed supplying means and the feed transporting tube 2 are free from feed, so that the portion of feed per adjustable sleeve 52 depends on the setting of the spacers 22. Then the feed trough 1 is lowered to the feeding position shown in FIG. 1 or FIG. 3 so that the portions of feed from the metering spaces are on the bottom of the feed trough, after which the poultry can eat the feed from the feed trough 1.

Figure 11:
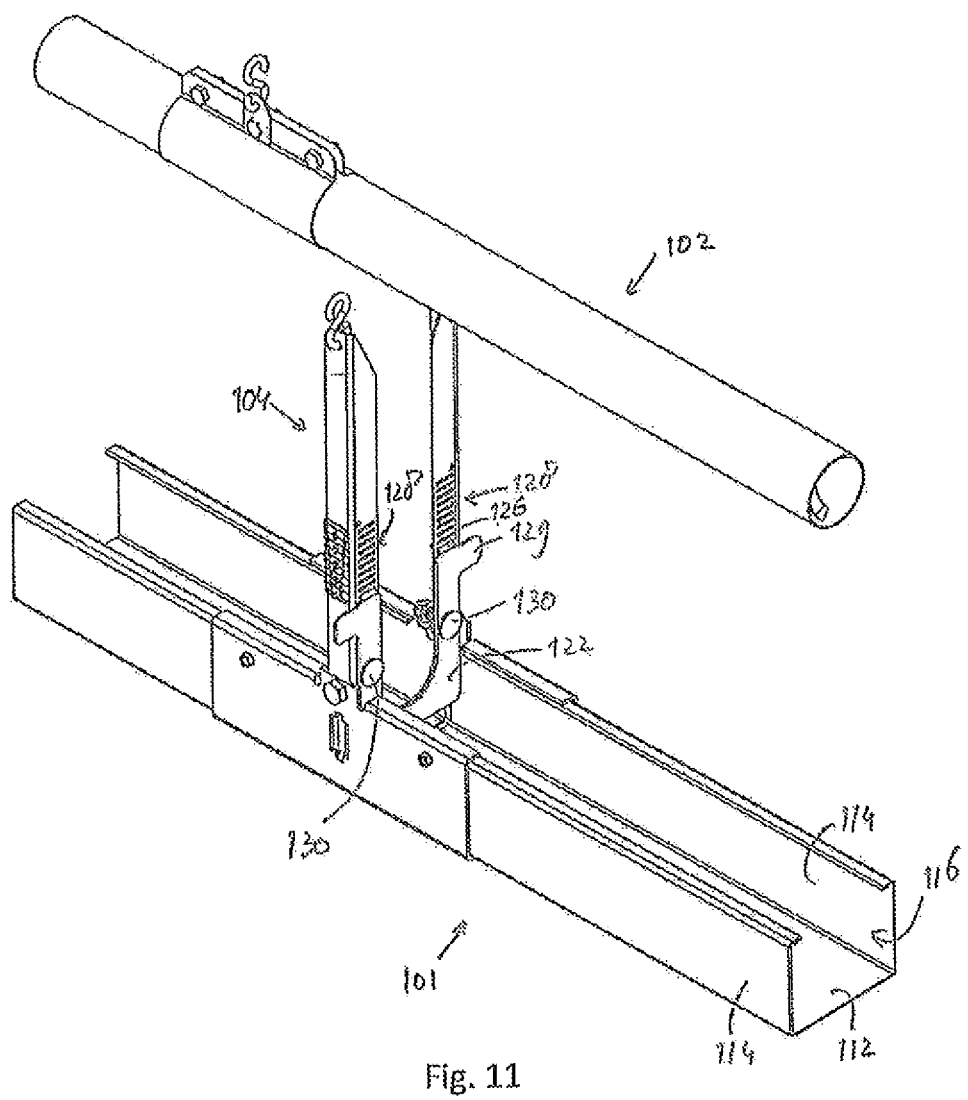
FIG. 11 shows, in isometric view, a part of a further preferred embodiment of a feeding device according to the invention, in a feeding position.

FIG. 11 shows a feeding device in the feeding position; said feeding device is provided with said spacers but does not have said metering units. The feeding device is otherwise the same as the aforementioned feeding device according to FIGS. 1-10. Identical components are therefore indicated with identical reference numbers, but increased by 100, and for explanation of the components of the feeding device according to FIG. 11 reference should be made to the above explanation of the feeding device according to FIGS. 1-10.

The invention claimed is:
1. Feeding device for poultry such as cocks, comprising an elongate feed transporting element with at least a bottom wall,
a feed trough provided underneath it and parallel to it, which is provided with a bottom, upright side walls and an at least partially open upper side, a feed transporting device for transporting feed through the feed transporting element, and a displacing device for moving the feed transporting element and the feed trough in a vertical direction relative to one another between a filling position and a feeding position, wherein the feed transporting element is provided on its underside with a plurality of passages for feed and a plurality of individual metering units provided at a distance from one another on the underside of the feed transporting element, each of which connects to a passage of the plurality of passages and each of which is configured for metering an individual, predetermined portion of feed received from the feed transporting element into the feed trough, wherein each metering unit comprises a metering space delimited at least partly by a peripheral wall, wherein the metering space determines a volume for the portion of feed to be metered with said metering unit, in which, at least in the filling position, each metering unit is in contact with the bottom of the feed trough so that the peripheral wall of the metering unit together with the bottom of the feed trough and the bottom wall of the feed transporting element closes the metering space of the metering unit for feed so as to be able to fill the metering space in the filling position with the portion of feed from the feed transporting element, via the respective passage, wherein, in the feeding position, the feed transporting element is located at a greater distance from the feed trough than in the filling position, so that the plurality of metering units are clear of the bottom of the feed trough so that the portions of feed metered on the bottom of the feed trough are accessible for the poultry, and wherein, in the filling position, the feed transporting element is at a predetermined distance from the bottom of the feed trough, adjustable in a range between a minimum and a maximum value, wherein a height of the peripheral wall of each of the metering units, in the vertical direction, can be altered so that, in the range between the minimum and the maximum value, the metering unit is in contact with the bottom of the feed trough.

2. Feeding device according to claim 1, wherein the feeding device comprises adjusting means for setting the mutual distance between the feed transporting element and the bottom of the feed trough in the filling position, wherein the adjusting means comprise a number of spacers each with a supporting surface for supporting the feed transporting element, wherein the distance between the supporting surface and the bottom of the feed trough is adjustable for setting, at the location of each spacer, the mutual distance between the feed transporting element and the bottom of the feed trough, so that the volume of the metering space of each of the metering units can be altered in relation to the mutual distance between the feed transporting element and the bottom of the feed trough.

3. Feeding device according to claim 1, wherein the peripheral wall of each of the metering units comprises a first peripheral wall part and a second peripheral wall part, wherein the first peripheral wall part and the second peripheral wall part are arranged to surround the metering space at least partially, wherein the first peripheral wall part and the second peripheral wall part are movable relative to one other for altering the volume of the metering space of the metering unit.

4. Feeding device according to claim 3, wherein the first peripheral wall part of each of the metering units is arranged so as to surround the second peripheral wall part of the metering unit at least partly on the outside thereof, wherein the first peripheral wall part is slidable along an outer side of the second peripheral wall part for altering the volume of the metering space of the metering unit.

5. Feeding device according to claim 4, wherein the first peripheral wall part is shell-shaped and connects on an upper side to the feed transporting element and on an underside has a preferably collar extending outwards, and wherein the second peripheral wall part is shell-shaped and on an upper side has an upper edge extending inwards that surrounds the shell shape of the first peripheral wall part and with which the second peripheral wall part can be suspended on the first peripheral wall part.

6. Feeding device according to claim 1, wherein the volume of the metering space of each of the metering units in operation of the metering device changes automatically as a result of mutual movement of the feed trough and feed transporting element in the vertical direction.

7. Feeding device according to claim 1, wherein the metering units are provided at a distance apart in the range 5-50 cm, preferably 10-25 cm.

8. Feeding device according to claim 2, wherein, in the filling position, the volume of the metering space of each of the metering units is in the range 0.01-0.05 $m^3$.

9. Feeding device according to claim 1, wherein the feed trough, viewed over its length, is provided with suspension elements located at a distance from each other for suspending the feed trough in an animal house.

10. Feeding device according to claim 9, wherein in each case a spacer is connected to a suspension element.

11. Feeding device according to claim 10, wherein the suspension elements are plate-shaped wherein the plate surface is located transversely to the longitudinal direction of the feed trough, wherein a slot is made in the plate surface transversely to the bottom of the feed trough, which is adapted to the geometry of the feed transporting element, wherein the feed transporting element extends through slots of suspension elements and wherein, in the filling position, the feed transporting element comes up against ends of the slots located near the bottom of the feed trough or against the spacers.

12. Feeding device according to claim 10, wherein each of the spacers is connected by means of a stepwise adjustable connection to the associated suspension element.

13. Feeding device according to claim 11, wherein the slots have an open end on an upper side of the suspension elements, said open end being funnel-shaped for guiding the feed transporting element into the slot during movement from the feeding position to the filling position.

14. Feeding device according to claim 9, wherein the displacing device is arranged for raising the feed trough in the vertical direction on the suspension elements of the feed trough towards the feed transporting element, for moving the feed trough from the feeding position to the filling position.

15. Feeding device according to claim 1, wherein the displacing device comprises a winch structure, for moving the feed transporting element and the feed trough in the vertical direction relative to one other.

16. Animal house provided with at least one feeding device according to claim 1.

17. Method for using a feeding device according to claim 1, comprising the successive steps of:

a) in the filling position, transporting feed with the feed transporting device through the feed transporting element in such a way that feed is filled via the passages from the feed transporting element into the respective metering spaces of the metering units,
b) after stopping the transporting, bringing the feeding device into the feeding position by moving the feed trough and the feed transporting element away from each other so that the metering units are no longer in contact with the bottom of the feed trough and so that poultry is able to reach the feed from the metering spaces on the bottom of the feed trough,
c) allowing feed to be eaten by poultry,
d) moving the feeding device to the filling position by moving the feed trough and the feed transporting element towards each other, and
e) repeating steps a) to d) inclusive.

18. Method according to claim 17, wherein between two successive steps d), the setting of the mutual distance in the filling position between the feed transporting element and the bottom of the feed trough is altered with the adjusting means in order to alter the volume of the metering spaces of the metering units.

19. Method according to claim 17, further comprising the step prior to step a) of determining a required amount of feed to be able to fill each of the metering spaces with feed, wherein this required amount of feed is transported by the feed transporting element during step a) so that step b) does not take place before at least almost the complete amount of feed has been filled in the metering spaces.

* * * * *